(12) United States Patent
An (10) Patent No.: US 11,614,121 B2
(45) Date of Patent: Mar. 28, 2023

(54) DEEP GROOVE BALL BEARING AND DIFFERENTIAL

(71) Applicant: Aktiebolaget SKF, Gothenburg (SE)

(72) Inventor: Hongyuan An, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/377,561

(22) Filed: Jul. 16, 2021

(65) Prior Publication Data
US 2022/0025925 A1 Jan. 27, 2022

(30) Foreign Application Priority Data

Jul. 27, 2020 (CN) .......................... 202010731075.2

(51) Int. Cl.
*F16C 19/16* (2006.01)
*F16C 33/38* (2006.01)

(52) U.S. Cl.
CPC .......... *F16C 19/16* (2013.01); *F16C 33/3887* (2013.01); *F16C 2361/61* (2013.01)

(58) Field of Classification Search
CPC .. F16C 19/16; F16C 33/7806; F16C 2361/61; F16C 33/3887
See application file for complete search history.

(56) References Cited

FOREIGN PATENT DOCUMENTS

| CN | 108361275 A | * | 8/2018 | ............... F16C 19/16 |
| DE | 102011077541 A1 | * | 12/2012 | ............... F16C 19/16 |
| JP | 2002250354 A | * | 9/2002 | ............ F16C 33/667 |
| JP | 2013072451 A | * | 4/2013 | .......... F16C 33/3875 |
| WO | WO-2011155456 A1 | * | 12/2011 | .......... F16C 33/3875 |
| WO | WO-2016076152 A1 | * | 5/2016 | ............. F16C 19/16 |

OTHER PUBLICATIONS

JP2002250354_abstract_translation.*

* cited by examiner

*Primary Examiner* — Phillip A Johnson
(74) *Attorney, Agent, or Firm* — Garcia-Zamor Intellectual Property Law, LLC; Ruy Garcia-Zamor (57) ABSTRACT

The present invention proposes a deep groove ball bearing, having an outer ring, an inner ring, spherical rollers located between the inner ring and outer ring, and a cage for holding the spherical rollers. In an axial direction, the inner ring has a first inner ring shoulder at a first side, and a second inner ring shoulder at a second side opposite the first side; and a first inner ring shoulder diameter of the first inner ring shoulder is configured to be larger than a second inner ring shoulder diameter of the second inner ring shoulder. The present invention further proposes a differential including the deep groove ball bearing.

9 Claims, 5 Drawing Sheets

DEEP GROOVE BALL BEARING AND DIFFERENTIAL

CROSS-REFERENCE TO RELATED APPLICATIONS

This application claims priority to Chinese Patent Application no. 202010731075.2, filed Jul. 27, 2020, the contents of which is fully incorporated herein by reference.

TECHNICAL FIELD

The present invention relates to a deep groove ball bearing and a differential having the deep groove ball bearing installed therein.

BACKGROUND OF THE INVENTION

Axial loads are very high in gearbox applications, especially in bearings on motor vehicle differentials. In general, two bearings on a differential shaft are fixed in one direction, meaning that the two bearings are only able to sustain an axial load in one direction, and the axial load is very high. In the case of deep groove ball bearings, very high axial loads of this type will cause the spherical rollers (steel balls) to move excessively towards the boundary between the ring raceway and the ring shoulder, and will thus cause stress concentration, leading to early failure of the deep groove ball bearing.

Thus, for heavy-load operating conditions and combined loads of radial and axial forces, conical roller bearings and single row angular contact ball bearings are generally used in the art instead of deep groove ball bearings. Conical roller bearings have the advantage of high load-bearing capacity, but also have high friction torque, and this will result in high energy consumption, so that the energy consumption per 100 km of the vehicle is high. Single row angular contact ball bearings can sustain higher axial loads in one direction, but are unable to sustain axial loads in the opposite direction, i.e. cannot sustain bidirectional axial loads.

Ordinary deep groove ball bearings can sustain bidirectional axial forces and are structurally simpler and easier to install than conical roller bearings and angular contact ball bearings; however, on account of their construction and the abovementioned limitations in load-bearing ability, it is considered in the art that deep groove ball bearings cannot be used in structures that sustain higher axial loads in one direction, such as differential shafts.

SUMMARY OF THE INVENTION

The present invention proposes an improved deep groove ball bearing that can be used in any structure sustaining a higher axial load at one side, e.g. structures like differential shafts. Specifically, in order to adapt to a high axial load in one direction and normal axial loads in two directions, and using a normal assembly process, the shoulder diameters and raceways of the outer ring and inner ring, etc. have been optimized, such that the inner ring shoulder at the side sustaining the high axial load has an increased diameter, while a standard design can be used for the diameter of the inner ring shoulder at the opposite side. This type of customized deep groove ball bearing can sustain axial loads in two directions, and can also sustain a higher axial load in one direction, thus being able to adapt to a variety of load combinations. A standard deep groove ball bearing assembly process is thus also suitable for the structure of the present invention, which sustains a higher load in one direction, avoiding the costs associated with production line improvement.

Thus, the present invention proposes a deep groove ball bearing, comprising an outer ring, an inner ring, spherical rollers located between the inner ring and outer ring, and a cage for holding the spherical rollers, wherein, in an axial direction, the inner ring has a first inner ring shoulder at a first side, and a second inner ring shoulder at a second side opposite the first side; and a first inner ring shoulder diameter IRSD1 of the first inner ring shoulder is configured to be larger than a second inner ring shoulder diameter IRSD2 of the second inner ring shoulder.

The present invention further proposes a differential, comprising a differential shaft and the deep groove ball bearing as described in any of the above aspects, mounted on the differential shaft.

DETAILED DESCRIPTION OF THE INVENTION

In view of the abovementioned problems in the prior art, the inventors have designed and modified component parts of a deep groove ball bearing after researching the structure of deep groove ball bearings and the forces sustained thereby, and propose an improved deep groove ball bearing after a series of experimental tests, to enable the bearing to be used in structures that sustain a higher axial load at one side in the axial direction (e.g. structures like differential shafts) while still benefiting from the advantages of deep groove ball bearings in being structurally simple and easy to install.

FIGS. 1-4 show the structure of the deep groove ball bearing according to some embodiments of the present invention. To facilitate explanation, the direction of the rotation axis of the deep groove ball bearing 1 is called the axial direction hereinbelow, and a direction perpendicular to the axial direction is called the radial direction.

The deep groove ball bearing 1 according to some embodiments comprises an outer ring 11, an inner ring 12, spherical rollers 13 arranged between the inner ring 12 and outer ring 11, and a cage 14 for holding the spherical rollers 13.

Figure 1:
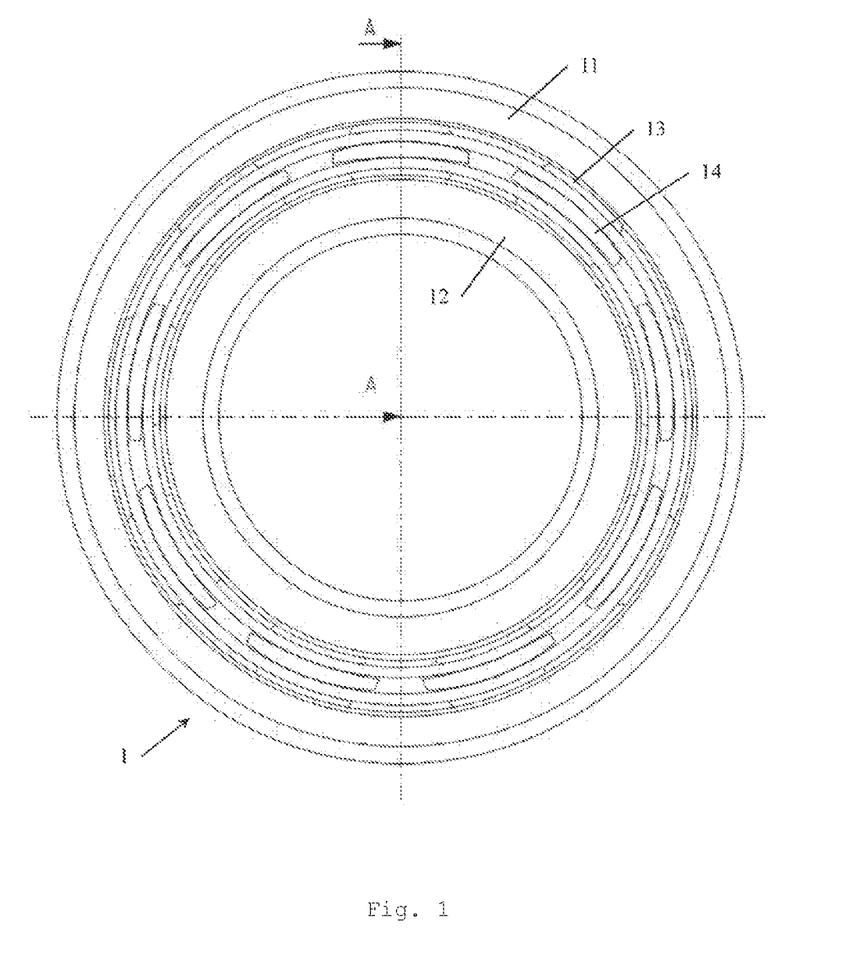
FIG. 1 is a top view of the deep groove ball bearing according to some embodiments of the present invention.
Figure 2:
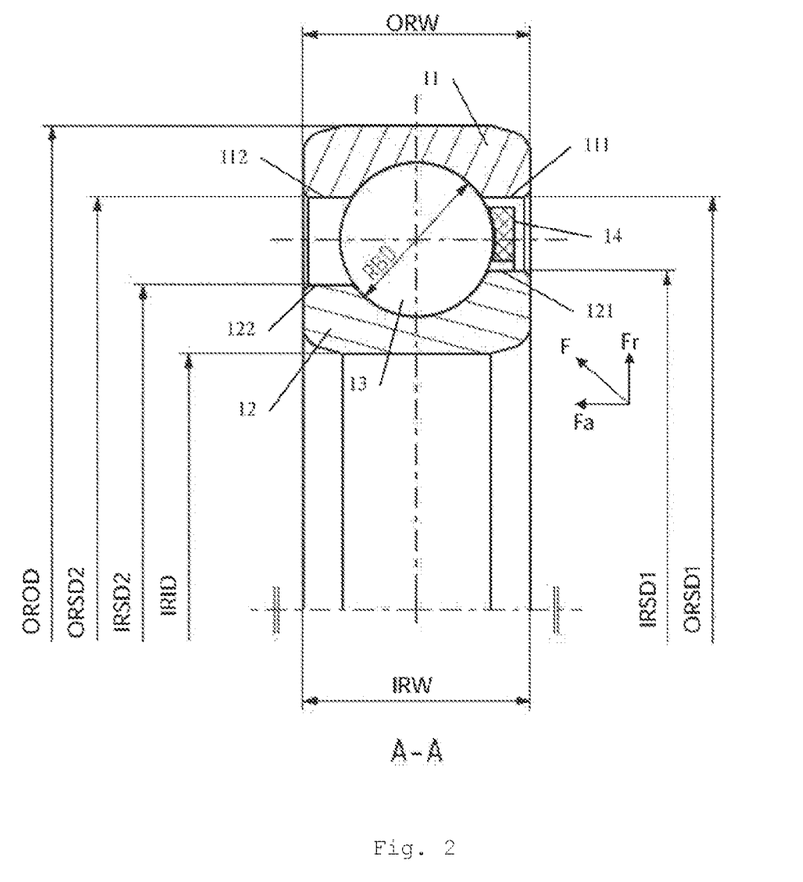
FIG. 2 is a sectional drawing of the deep groove ball bearing according to some embodiments of the present invention, taken along line A-A in FIG. 1.

As shown in FIG. 2, the inner ring 12 of the deep groove ball bearing sustains a larger force at a first side in the axial direction (the right side in FIGS. 2-4), e.g. an oblique force F as shown in FIG. 2, and this force can be resolved into an axial component of force Fa and a radial component of force Fr. At a second side opposite the first side (the left side in FIGS. 2-4), the inner ring 12 sustains a smaller force or almost no force. It should be understood that in a different application scenario, the deep groove ball bearing might only sustain a larger force parallel to the axial direction at the first side, not an oblique force as shown in the figure. Thus, an improvement to the deep groove ball bearing is proposed for the case where a larger axial force (component of force) is sustained at one side (the first side).

Figure 3:
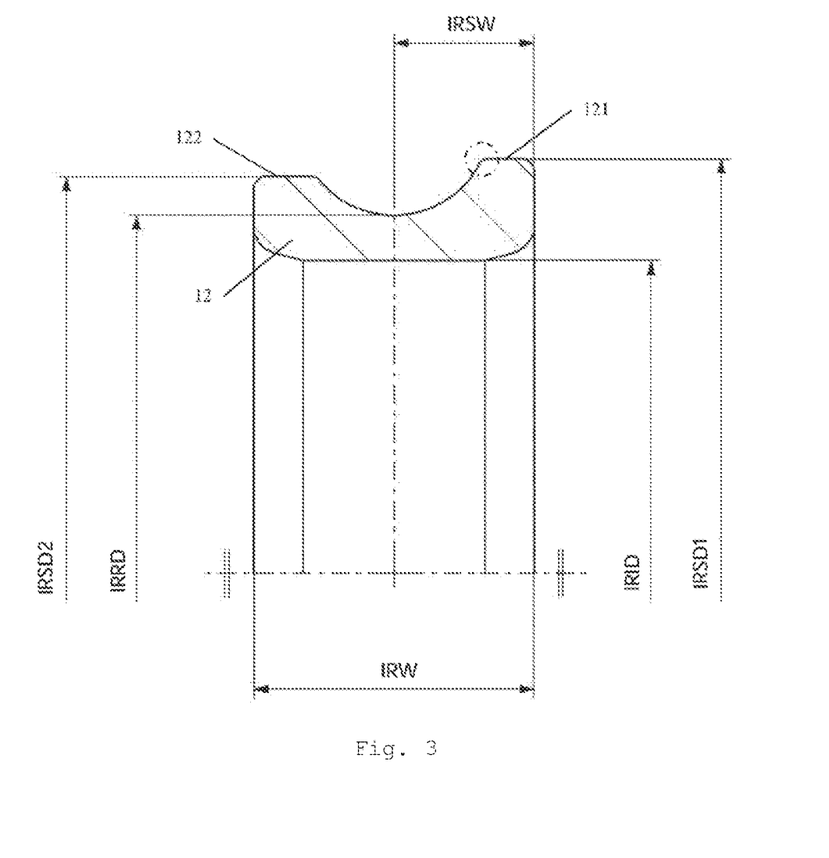
FIG. 3 is a sectional drawing of the inner ring of the deep groove ball bearing according to some embodiments of the present invention.

As shown in FIGS. 2 and 3, the inner ring 12 has a first inner ring shoulder 121 at the first side, and a second inner ring shoulder 122 at the second side. The inner ring 12 has an inner ring width IRW in the axial direction and an inner ring inner diameter IRID, and an axial distance (width) IRSW from an end face of the first inner ring shoulder 121 at the first side to the centre of curvature of an inner ring raceway. Furthermore, the inner ring 12 also has an inner ring raceway groove bottom diameter IRRD; the inner ring raceway groove bottom diameter IRRD is the minimum diameter of the inner ring raceway in the radial direction.

Figure 4:
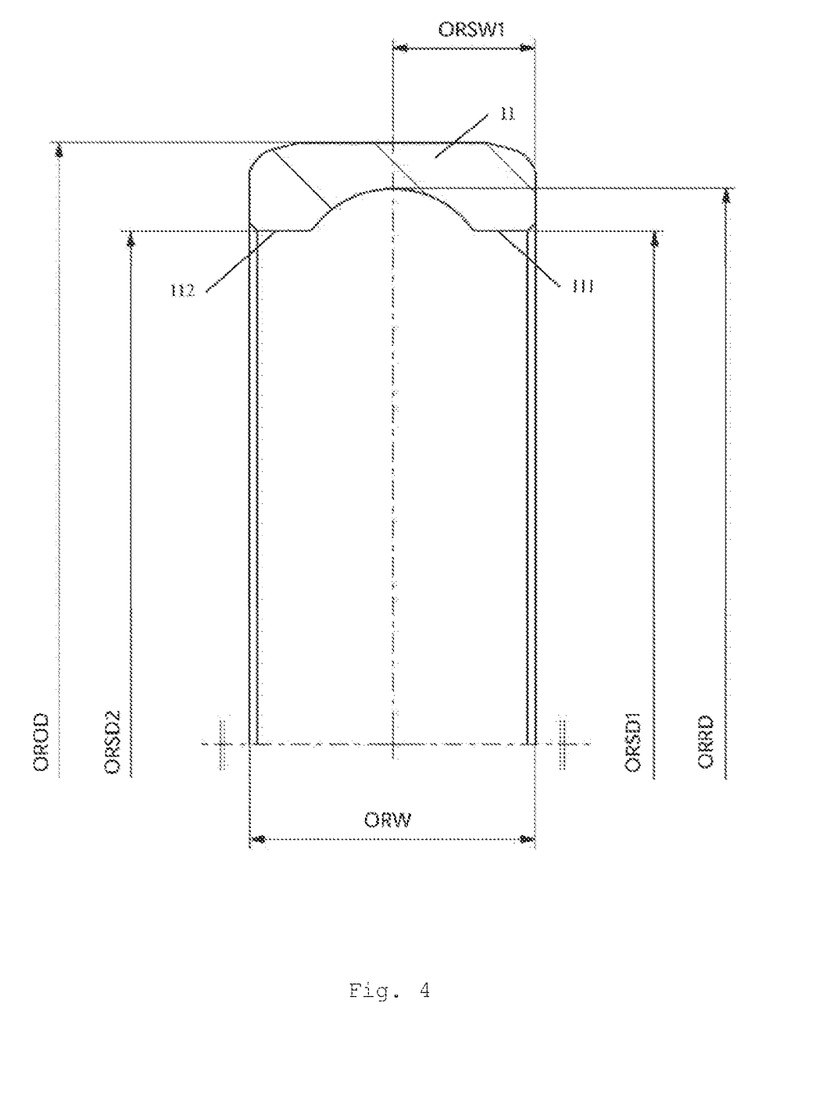
FIG. 4 is a sectional drawing of the outer ring of the deep groove ball bearing according to some embodiments of the present invention.

As shown in FIGS. 2 and 4, the outer ring 11 has a first outer ring shoulder 111 at the first side, and a second outer ring shoulder 112 at the second side. The outer ring 11 has an outer ring width ORW in the axial direction, an outer ring outer diameter OROD, a first outer ring shoulder diameter ORSD1 of the first outer ring shoulder 111 and a second outer ring shoulder diameter ORSD2 of the second outer ring shoulder 112, and an axial distance ORSW1 from an end face of the first outer ring shoulder 111 at the first side to the centre of curvature of an outer ring raceway. Furthermore, the outer ring 11 also has an outer ring raceway groove bottom diameter ORRD; the outer ring raceway groove bottom diameter ORRD is the maximum diameter of the outer ring raceway in the radial direction.

As shown in FIGS. 2-3, according to some embodiments of the present invention, a first inner ring shoulder diameter IRSD1 of the inner ring 12 is configured to be larger than a second inner ring shoulder diameter IRSD2. It should be noted that the second inner ring shoulder diameter IRSD2 here may be the diameter of a standard inner ring shoulder that has not been modified.

As a result of this improvement, the first inner ring shoulder 121 is larger than the second inner ring shoulder 122, and is thus able to sustain a larger axial force, e.g. the axial component of force Fa shown in FIG. 2.

Further, in order to enable the deep groove ball bearing to be used more effectively in structures sustaining a larger axial force at one side, the deep groove ball bearing inner ring and outer ring, etc. have been further researched and optimized, and the relationship among the inner ring shoulders, outer ring shoulders and spherical rollers is also proposed.

For example, the second inner ring shoulder diameter IRSD2, the inner ring raceway groove bottom diameter IRRD and the diameter RBD of the spherical rollers can satisfy the following relation (1):

$$\frac{(IRSD2 - IRRD)}{RBD} \geq 0.25 \quad (1)$$

Furthermore, after in-depth research and design and experimental tests, the present invention proposes the concept of "shoulder difference/ball diameter ratio" for the first time; specifically, the first inner ring shoulder diameter IRSD1, the second inner ring shoulder diameter IRSD2 and the diameter RBD of the spherical rollers can satisfy the following relation (2):

$$\frac{(IRSD1 - IRSD2)}{RBD} \geq 0.05 \quad (2)$$

Through the relations (1) and (2) above, and especially because the "shoulder difference/ball diameter ratio" has been designed, it is possible to optimize the customized deep groove ball bearing; specifically, the first inner ring shoulder diameter IRSD1 is not simply configured to be larger than the second inner ring shoulder diameter IRSD2, but the relationship among the first and second inner ring shoulders, the inner ring raceway and the spherical rollers is also taken into account at the same time, to enable the modified deep groove ball bearing to reliably sustain a larger axial load at one side, while ensuring simplicity of the deep groove ball bearing manufacturing process and greater stability of operation of the structure in which it is installed.

In addition, the shoulder difference/ball diameter ratio can also have different ranges, depending on the structure in which the deep groove ball bearing is used and the forces sustained thereby. For example, but without limitation:

$$\frac{(IRSD1 - IRSD2)}{RBD} \geq 0.1$$

$$\frac{(IRSD1 - IRSD2)}{RBD} \geq 0.125$$

$$\frac{(IRSD1 - IRSD2)}{RBD} \geq 0.15$$

That is to say, the shoulder difference/ball diameter ratio may have a value greater than or equal to 0.05 or greater than or equal to 0.1 or greater than or equal to 0.125 or greater than or equal to 0.15, and may also be a value in any range formed by the four endpoint values 0.05, 0.1, 0.125 and 0.15, e.g. the range of 0.05-0.1 or 0.1-0.125 or 0.125-0.15, etc.

In addition, in order to better adapt to the installation and force-bearing needs of different structures, the present invention also proposes improvements in other respects. The outer ring width and inner ring width of the bearing can be set differently according to the needs of the structure in which the deep groove ball bearing in some embodiments of the present invention is used. For example, in the exemplary differential application shown in FIG. 5, it is necessary to use a spacer between the bearing outer ring and the associated structure (as shown at the two deep groove ball bearing 1 positions at the bottom of FIG. 5), thus the outer ring width needs to be reduced. For this situation, the present invention has further researched and designed the relationship between the inner ring width IRW of the inner ring 12 and the outer ring width ORW of the outer ring 11:

IRW−ORW≥1 mm

That is to say, the width IRW of the inner ring 12 is greater than the width ORW of the outer ring 11, thus the inner ring 12 protrudes slightly relative to the outer ring 11.

It can thus be understood that the inner ring width IRW and outer ring width ORW can also be configured to satisfy the following relation, according to the actual needs of other structures:

ORW−IRW≥1 mm

That is to say, the width IRW of the inner ring 12 is smaller than the width ORW of the outer ring 11, thus the inner ring 12 is recessed slightly relative to the outer ring 11.

In addition, the first inner ring shoulder 121 has a first inner ring shoulder end face at the first side, and the second inner ring shoulder 122 has a second inner ring shoulder end face at the second side. As in a conventional deep groove ball bearing, the distance from the centre of curvature of the inner ring raceway to the first inner ring shoulder end face and the distance from the centre of curvature of the inner ring raceway to the second inner ring shoulder end face can be equal. However, according to some improved embodiments of the present invention, the distance from the centre of curvature of the inner ring raceway to the first inner ring shoulder end face and the distance from the centre of curvature of the inner ring raceway to the second inner ring shoulder end face are not equal, and the relationship between the larger value IRSW of the two distances and the inner ring width IRW is preferably configured to satisfy the following relation:

$$\frac{IRSW}{IRW} \geq 0.51$$

Further, according to a preferred form as shown in FIG. 3, that is to say that compared with the second side, the axial distance IRSW from the centre of curvature of the inner ring raceway to the first inner ring shoulder end face is larger, such that the IRSW at the first side and the inner ring width IRW satisfy the above relation.

In this way, the first inner ring shoulder 121 not only has a larger diameter at the first side (i.e. there is a difference in diameter between the first and second inner ring shoulders) but also has a larger width, enabling the first inner ring shoulder 121 to sustain a higher axial load from the first side more effectively.

According to a further improvement, a transitional part between the inner ring raceway and the first inner ring shoulder 121 (e.g. the region indicated by the dotted-line circle in FIG. 3) is chamfered or rounded, so as to reduce stress concentration at this position when a high axial load is being sustained. Further, a transitional part between the inner ring raceway and the second inner ring shoulder 122 may also be chamfered or rounded.

In addition, depending on application demands, the deep groove ball bearing 1 may also comprise a bearing sealing structure (not shown) arranged between the outer ring 11 and inner ring 12, so that the interior of the deep groove ball bearing (including the spherical rollers, the cage and the raceways, etc.) is sealed with respect to the outside. This sealing structure is for example a dust-proof sealing cap, a non-contact rubber sealing ring, a contact rubber sealing ring, etc.

The deep groove ball bearing according to some embodiments of the present invention can be used for deep groove ball bearings of different dimensional specifications very effectively, enabling such bearings to be used very effectively in structures that need to sustain a higher axial load at one side.

For this purpose, the inventor of the present invention has carried out tests for several application scenarios. The objects of testing were a deep groove ball bearing having conventional external dimensions and the improved deep groove ball bearing according to some embodiments of the present invention.

For example, one of the tests was carried out on bearings having the same external dimensions, specifically an inner ring inner diameter of 45 mm, an outer ring outer diameter of 85 mm and a width of 20 mm, and the test was carried out in extreme operating conditions of a radial force of 27934 N and an axial force of 22196 N.

The test results show that in the conventional deep groove ball bearing, the maximum contact pressure between the spherical roller and the inner ring raceway can reach about 5100 MPa. In the deep groove ball bearing according to some embodiments, the contact pressure between the spherical roller and the inner ring raceway can be reduced to about 4100 MPa.

The results of a large amount of experimentation and research show that compared with the conventional deep groove ball bearing, the improved deep groove ball bearing according to some embodiments has significantly reduced contact pressure, thus avoiding early bearing failure due to excessive contact pressure.

Figure 5:
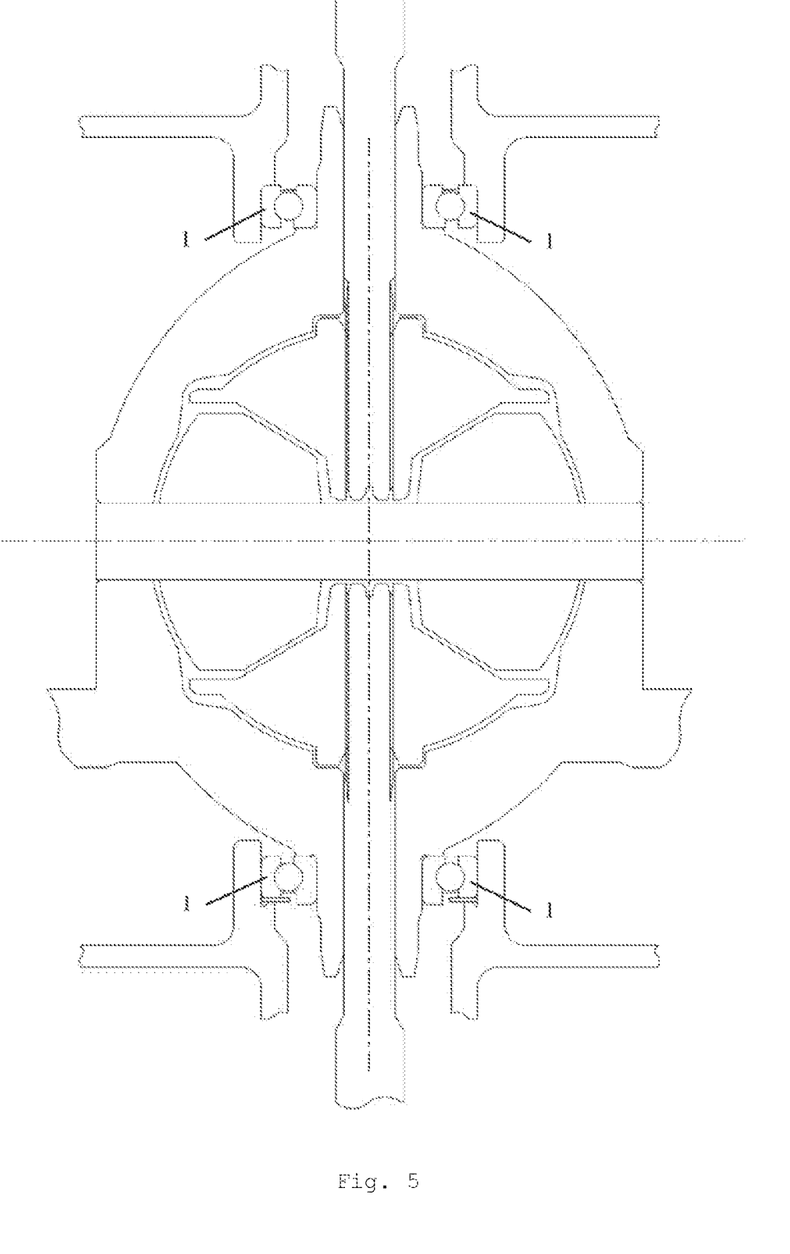
FIG. 5 is a schematic diagram of the differential shaft according to some embodiments of the present invention, with the improved deep groove ball bearing mounted thereon.

This improved deep groove ball bearing can be used in a variety of scenarios, e.g. in a differential. Thus, the present invention also proposes a differential, comprising deep groove ball bearings according to the embodiments described above, mounted on a differential shaft. As shown in FIG. 5, the improved deep groove ball bearings 1 are used on a differential shaft, and both sustain higher loads from one side in the axial direction. After adopting such improved deep groove ball bearings, the differential can still operate stably and efficiently, and has a significantly increased life.

Forms of implementation of the solution proposed in the present disclosure have been described in detail above with reference to preferred embodiments; however, those skilled in the art will understand that various alterations and changes could be made to the particular embodiments above without deviating from the concept of the present disclosure, and the various technical features and structures proposed in the present disclosure could be combined in various ways without exceeding the scope of protection of the present disclosure, which is determined by the attached claims.

The invention claimed is:

1. A deep groove ball bearing, comprising:
an outer ring,
an inner ring,
spherical rollers located between the inner ring and outer ring, and
a cage for holding the spherical rollers, wherein in an axial direction, the inner ring has a first inner ring shoulder at a first side, and a second inner ring shoulder at a second side opposite the first side, and wherein a first inner ring shoulder diameter of the first inner ring shoulder is configured to be larger than a second inner ring shoulder diameter of the second inner ring shoulder,
wherein the second inner ring shoulder diameter IRSD2, an inner ring raceway groove bottom diameter IRRD of the inner ring and the diameter RBD of the spherical rollers satisfy the following relation (1):

$$\frac{(IRSD2 - IRRD)}{RBD} \geq 0.25, \text{ and} \qquad (1)$$

the first inner ring shoulder diameter IRSD1, the second inner ring shoulder diameter IRSD2 and the diameter RBD of the spherical rollers satisfy the following relation (2):

$$\frac{(IRSD1 - IRSD2)}{RBD} \geq 0.05. \tag{2}$$

2. The deep groove ball bearing according to claim 1, wherein a transitional part between the inner ring raceway and the first inner ring shoulder is chamfered or rounded; and/or a transitional part between the inner ring raceway and the second inner ring shoulder is chamfered or rounded.

3. The deep groove ball bearing according to claim 1, further comprising a bearing sealing structure arranged between the outer ring and the inner ring, so that the interior of the deep groove ball bearing is sealed with respect to the outside.

4. A differential comprising:
a differential shaft, and
the deep groove ball bearing according to claim 1, wherein the deep groove ball bearing is mounted on the differential shaft.

5. A deep groove ball bearing, comprising:
an outer ring,
an inner ring,
spherical rollers located between the inner ring and outer ring, and
a cage for holding the spherical rollers, wherein in an axial direction, the inner ring has a first inner ring shoulder at a first side, and a second inner ring shoulder at a second side opposite the first side, and wherein a first inner ring shoulder diameter of the first inner ring shoulder is configured to be larger than a second inner ring shoulder diameter of the second inner ring shoulder,
wherein the second inner ring shoulder diameter IRSD2, an inner ring raceway groove bottom diameter IRRD of the inner ring and the diameter RBD of the spherical rollers satisfy the following relation (1):

$$\frac{(IRSD2 - IRRD)}{RBD} \geq 0.25, \text{ and} \tag{1}$$

the first inner ring shoulder diameter IRSD1, the second inner ring shoulder diameter IRSD2 and the diameter RBD of the spherical rollers satisfy the following relation (3):

$$\frac{(IRSD1 - IRSD2)}{RBD} \geq 0.1. \tag{3}$$

6. A deep groove ball bearing, comprising:
an outer ring,
an inner ring,
spherical rollers located between the inner ring and outer ring, and
a cage for holding the spherical rollers, wherein in an axial direction, the inner ring has a first inner ring shoulder at a first side, and a second inner ring shoulder at a second side opposite the first side, and wherein a first inner ring shoulder diameter of the first inner ring shoulder is configured to be larger than a second inner ring shoulder diameter of the second inner ring shoulder,
wherein the second inner ring shoulder diameter IRSD2, an inner ring raceway groove bottom diameter IRRD of the inner ring and the diameter RBD of the spherical rollers satisfy the following relation (1):

$$\frac{(IRSD2 - IRRD)}{RBD} \geq 0.25, \text{ and} \tag{1}$$

the first inner ring shoulder diameter IRSD1, the second inner ring shoulder diameter IRSD2 and the diameter RBD of the spherical rollers satisfy the following relation (4):

$$\frac{(IRSD1 - IRSD2)}{RBD} \geq 0.125. \tag{4}$$

7. A deep groove ball bearing, comprising:
an outer ring,
an inner ring,
spherical rollers located between the inner ring and outer ring, and
a cage for holding the spherical rollers, wherein in an axial direction, the inner ring has a first inner ring shoulder at a first side, and a second inner ring shoulder at a second side opposite the first side, and wherein a first inner ring shoulder diameter of the first inner ring shoulder is configured to be larger than a second inner ring shoulder diameter of the second inner ring shoulder,
wherein the second inner ring shoulder diameter IRSD2, an inner ring raceway groove bottom diameter IRRD of the inner ring and the diameter RBD of the spherical rollers satisfy the following relation (1):

$$\frac{(IRSD2 - IRRD)}{RBD} \geq 0.25, \text{ and} \tag{1}$$

the first inner ring shoulder diameter IRSD1, the second inner ring shoulder diameter IRSD2 and the diameter RBD of the spherical rollers satisfy the following relation (5):

$$\frac{(IRSD1 - IRSD2)}{RBD} \geq 0.15. \tag{5}$$

8. A deep groove ball bearing, comprising:
an outer ring,
an inner ring,
spherical rollers located between the inner ring and outer ring, and
a cage for holding the spherical rollers, wherein in an axial direction, the inner ring has a first inner ring shoulder at a first side, and a second inner ring shoulder at a second side opposite the first side, and wherein a first inner ring shoulder diameter of the first inner ring shoulder is configured to be larger than a second inner ring shoulder diameter of the second inner ring shoulder,
wherein an inner ring width IRW of the inner ring in the axial direction and an outer ring width ORW of the outer ring in the axial direction satisfy the following relation:

IRW−ORW≥1 mm, or

ORW−IRW≥1 mm.

9. A deep groove ball bearing, comprising:
an outer ring,
an inner ring,
spherical rollers located between the inner ring and outer ring, and
a cage for holding the spherical rollers, wherein in an axial direction, the inner ring has a first inner ring shoulder at a first side, and a second inner ring shoulder at a second side opposite the first side, and wherein a first inner ring shoulder diameter of the first inner ring shoulder is configured to be larger than a second inner ring shoulder diameter of the second inner ring shoulder,
wherein the first inner ring shoulder has a first inner ring shoulder end face at the first side, and the second inner ring shoulder has a second inner ring shoulder end face at the second side, wherein the distance from the centre of curvature of an inner ring raceway to the first inner ring shoulder end face and the distance from the centre of curvature of the inner ring raceway to the second inner ring shoulder end face are not equal, and the larger value IRSW of the two distances and an inner ring width IRW of the inner ring in the axial direction satisfy the following relation:

$IRSW/IRW \geq 0.51$.

* * * * *